2,951,873

CATALYSTS AND PROCESS FOR THE PREPARATION OF ALKYL SULFIDES

Hillis O. Folkins, Crystal Lake, and Elmer L. Miller, Cary, Ill., assignors to The Pure Oil Company, Chicago, Ill., a corporation of Ohio No Drawing. Filed Aug. 9, 1955, Ser. No. 527,416

11 Claims. (Cl. 260—609)

This invention relates to a novel preparation of thioethers. It is more directly concerned with a process and catalysts for the production of thioethers from low molecular weight aliphatic ethers and hydrogen sulfide.

Although thioethers occur naturally and may be recovered from particular types of high sulfur crude oils, the contents vary and are generally so small that their separation and purification does not produce sufficient amounts for commercial consumption. Thioethers are advancing in commercial importance because of their property of forming addition compounds with a variety of reactants, such as mercuric compounds, alkyl halides, and others. When reacted with this latter class of compounds, sulphonium compounds are formed which may be used for a number of applications. Thioethers are also susceptible to the action of oxidizing agents, such as nitric oxide, potassium permanganate, and others, and are converted to sulfoxides which may be employed as solvents, e.g., methyl sulfoxide; plasticizers, e.g., ethyl sulfoxide, etc. In addition, the lower molecular weight thioethers exhibit solvency action for a variety of organic substances alone or in combination with other organic materials such as low molecular weight aliphatic monohydric alcohols. It has been pointed out in the prior art that thioethers or alcoholic admixtures thereof can dissolve rubber as well as various resins, such as abietic acid, petroleum resin, cellulose nitrate, and others. Because of their flexibility in known applications, as well as the development of new uses, low molecular weight aliphatic thioethers are becoming raw materials of new importance.

Because of the potential applications of these compounds, a plurality of syntheses have been developed for their preparation. Perhaps the most general method for the preparation of thioethers is the reaction of alkyl halides with alkali metal sulfides or mercaptides. In addition, thioethers may be formed in reactions involving mercaptans wherein the mercaptan is reacted with an alcohol or is pyrolytically decomposed. The former reaction is not desirable because in certain instances the reaction forms the ethers instead of the thioethers. However, several investigators have reported the results of thioether formations from the pyrolytic decomposition of mercaptans. In general, their work was concerned with catalyst compositions for promoting the efficiency of the conversion of mercaptans to thioethers, according to the following reaction:

$$2RSH = RSR + H_2S$$

While cadmium sulfide has been used in this reaction, its activity alone was not sufficiently high for commercial purposes. However, it was found that cadmium sulfide—zinc sulfide—alumina oxide catalysts produced substantial conversions with excellent selectivity. However, the catalyst was readily poisoned by the mercaptan feed stock, appreciably shortening the catalyst's life. According to our invention, a new and novel synthesis for the production of low molecular weight alkyl thioethers has been found, wherein a low molecular weight saturated aliphatic ether and hydrogen sulfide produces a thioether under suitable reaction conditions.

It is therefore the primary object of this invention to provide a process and catalyst for the production of high yields of thioethers. These and other objects will become more apparent from the following detailed description of the instant invention.

In U.S. patent application 462,609, filed October 15, 1954, by the herein-named inventors, there is described a novel synthesis of low molecular weight aliphatic thiols by reacting a saturated aliphatic ether having not more than 8 carbon atoms per alkyl substituent and hydrogen sulfide in the presence of a composite alumina catalyst having incorporated therein a small amount of a promoting agent including potassium tungstate, potassium carbonate, et al. It has now been found that this reaction may be controlled to produce high yields of alkyl thioethers, according to this invention, by reacting a saturated aliphatic ether having 1 to 8 carbon atoms per alkyl substituent with hydrogen sulfide in the presence of a solid, porous, acidic oxide, hydrocarbon cracking catalyst, e.g., activated alumina, synthetic silica-alumina or synthetic silica-alumina combinations containing magnesia, zirconia and/or titania, acid-treated natural clays, silica in combination with magnesia, zirconia and/or titania, and other related compounds.

In carrying out this reaction to produce alkyl thioethers the following operating conditions are employed:

Temperature _____ 600°–950° F.
Pressure _____ Atmospheric–200 p.s.i.g.
Reactant mol ratio: H₂S/ROR_ 0.5–1.5.
Space velocity[1] _____ 50–500.

[1] Gaseous volume, at 60° F. and 14.7 p.s.i.a., of ether fed per hour per unit volume of effective reactor or catalyst bed.

The following examples illustrate the instant invention:

Example 1

Hydrogen sulfide and dimethyl ether were passed at 752° F. and atmospheric pressure over a catalyst consisting of 8–14 mesh activated alumina (Type F–10 of the Aluminum Co. of America). At a hydrogen ether to dimethyl sulfide ratio of 2.0 and an ether gaseous space velocity of 212 (STP), a molal yield of dimethyl sulfide (based on dimethyl ether) of 55% was obtained. Selectivity for the production of dimethyl sulfide was 62.7%.

Example 2

In another experiment, hydrogen sulfide and dimethyl ether were reacted under conditions similar to those in Example 1 over a catalyst composed of 2 weight percent copper oxide on F–10 activated alumina. This catalyst was prepared by soaking previously dried activated alumina (F–10; 8–14 mesh) in a solution of copper nitrate and decomposing the resulting mass to convert the nitrate into copper oxide. A 54% molal yield of dimethyl sulfide was obtained at a selectivity of 64%. In another run on this catalyst under similar conditions with the exception of a lower hydrogen sulfide/ether ratio (1.0) the yield is 65% and selectivity for dimethyl sulfide formation is 74%.

Example 3

A silica-alumina gel cracking catalyst (13% alumina) is employed in another experiment in which hydrogen sulfide and dimethyl ether are reacted at 750° F.; atmospheric pressure; H₂S/dimethlyl ether ratio=1.0; and at an ether gaseous space velocity of 200. A molal yield of dimethyl sulfide of 70% at a selectivity of 80% is obtained. Impregnating this catalyst with 5% zinc oxide increases the yield and selectivity. Under the same conditions as above, the yield of dimethyl sulfide is 72% at a selectivity of 87%. Methyl mercaptan accounts for the balance of the dimethyl ether converted.

Example 4

A silica-alumina gel mixture was prepared by forming a silica gel by the action of sulfuric acid on water-glass. To this slurry was added a solution of aluminum sulfate in a quantity such that the weight ratio of silica to alumina was 94 to 6. The resultant slurry was filtered, washed, and dried, followed by final removal of sodium ions by base exchange with ammonium chloride. To this silica-alumina complex, zirconia was added by base exchange with ammonium zirconium carbonate in a quantity such that the final weight ratio of silica:alumina:zirconia was in the ratio of 89:6:5. The catalyst was dried and calcined at 1150° F.

Hydrogen sulfide and dimethyl ether are passed over the above catalyst at 750° F.; atmospheric pressure; at a $H_2S$/dimethyl ether ratio of 1.0; and at an ether gaseous space velocity (STP) of 200. A molal yield of dimethyl sulfide of 76% at a selectivity of 82% is obtained.

Using the same catalyst, hydrogen sulfide and isopropyl ether are reacted at 725° F.; $H_2S$/ether mol ratio of 0.75 and at a total gaseous space velocity (STP) of 200. The molal yield of isopropyl sulfide is 71% and selectivity of reaction is 80%.

Example 5

Hydrogen sulfide and dimethyl ether are reacted over a catalyst composed of 5% copper oxide deposited by impregnation (and calcination) on a silica-magnesia (25%) cracking catalyst support. Reaction conditions are 750° F.; atmospheric pressure; $H_2S$/ether=2.0 mol; gaseous space velocity (STP)=200, based on ether.

Dimethyl sulfide is formed in 70% molal yield and selectivity is 68%. Under conditions similar to the above except at a $H_2S$/ether ratio of 0.75 the yield of dimethyl sulfide increases to 75% and selectivity is increased to 85%.

While the catalysts disclosed in this invention for the production of alkyl monosulfides from the reaction of hydrogen sulfide and ethers are quite sensitive to changes in reactant ratios, those catalysts which tend to produce thiols from the same reactants exhibit only slight changes in selectivity with changes in reactant ratios.

Thus, at 750° F. and at $H_2S$/methyl ether mol ratios of 2.0, catalysts such as activated alumina promoted by 10% potassium tungstate, and activated alumina promoted by 8.5% potassium carbonate, gave high yields of methyl mercaptan and only small amounts of sulfide, selectivities for mercaptan being 98% for the potassium tungstate-promoted catalyst and 91% for the catalyst promoted by potassium carbonate. At lower $H_2S$/methyl ether ratios (1.0) the selectivities for mercaptan formation over these catalysts are practically unchanged.

The catalysts which may be employed in carrying out the instant invention comprise a solid, porous, acidic oxide, hydrocarbon cracking catalyst, e.g., activated alumina, synthetic silica-alumina or synthetic silica-alumina combinations containing magnesia, zirconia and/or titania, acid-treated natural clays, silica in combination with magnesia, zirconia, and/or titania, and other related compounds. Catalysts of this nature have high selectivity for the production of thioethers. It has also been found that the efficacy of these catalysts may be enhanced by incorporating in the catalyst composition small amounts of an oxide of copper, silver, cerium or zinc. The preferred amount of metal oxide to be incorporated in the catalyst composition is between about 1–10% by weight of the catalyst.

Preparation methods for activated alumina and acid-type catalysts of the compositions described above are well-known. Alumina may be prepared by precipitation from soluble salts of alumina with bases, followed by calcination. Generally, heat treating at 1100–1200° F. is preferred to produce an alumina of the gamma type. The alkaline earth metal content should be low (under 0.5%) for best selectivity for sulfide formation.

Combination catalysts having acidic characteristics are prepared by numerous methods and are discussed in the literature. A common method for the preparation of silica-alumina combinations is outlined in Industrial and Engineering Chemistry, 44, 2860 (1952), whereby a silica hydrogel is prepared by the action of sulfuric acid on water-glass, followed by incorporation of the alumina by precipitation of an aluminum salt with a base. Other references for preparation of catalysts of these types may be found in Catalysis II, Emmett, page 5, etc., Reinhold Publishing Corporation, 1955. Thus, in the preparation of these acidic-type catalysts or supports, co-precipitation methods may be employed, or one gel may be formed before the inclusion of the other, and the resultant mixture calcined. Still another method is to add the second or succeeding gel to the already calcined first component of the catalyst. Also included is the method of mechanically mixing and forming into pellets powders of singly prepared components.

In the preparation of catalysts of this type in which are incorporated promoters of copper, cerium, silver or zinc oxides, similar methods may be employed. Thus, an already existing support, such as silica-alumina, may be impregnated with a copper salt such as the nitrate, and calcined to decompose the nitrate into copper oxide. Similarly, co-precipitation methods may be employed. Thus, in the preparation of copper oxide on silica-alumina, the silica hydrogel may be formed first, then filtered, washed and re-slurried. The alumina and copper may then be added as solutions of their soluble salts and precipitated into the existing silica gel slurry by means of a base such as ammonium hydroxide or ammonium carbonate. The resultant slurry is then filtered, washed if necessary, and finally calcined to yield the finished catalyst.

Since the process and catalyst are operable in either fixed-bed or fluidized operation, the physical form of the catalyst will be determined by the type of process to be employed. In fixed-bed operation it is desirable to size the material into a fairly narrow range of particle size or to pellet the material into conventional uniform pellets. In fluid operation, the material will be ground or formed into powder or microspheres in known manner.

In the practice of this invention, which involves the reaction of hydrogen sulfide and aliphatic saturated ethers for the formation of alkyl monosulfides, there may be used low molecular weight ethers having the formula $$R_1—O—R_2$$

wherein $R_1$ and $R_2$ are alkyl radicals having not more than 8 carbon atoms in the radical. However, the alkyl radicals may have either the same number or a different number of carbon atoms. Thus, in accordance with our invention, either symmetrical or non-symmetrical ethers may be reacted with hydrogen sulfide to form corresponding alkyl monosulfides. Examples of such ethers include but are not limited to dimethyl, methyl ethyl, diethyl, ethyl-hexyl, ethyl-isoamyl, di-n-propyl, di-n-butyl, sec-butyl, butyl-ethers, etc. Thus, symmetrical or non-symmetrical alkyl monosulfides having either straight chain or branched chain alkyl radicals may be produced. Similarly, mixtures of ethers may be charged to yield corresponding mixed sulfides.

Although excellent feed conversions and selectivities can be obtained by controlling the reactant ratios employing the catalysts of this invention, increased efficiency may be obtained by recycle operations wherein unreacted products contained in the reaction effluent are returned to the reaction zone for further processing. Accordingly, by employing a proper recycle system, alkyl monosulfide yields approaching 100% may be obtained.

The purification process employed in recovery of the thioethers prepared according to this invention will depend upon the volatility characteristics of the end-product. Generally, however, conventional fractional condensation and distillation processes may be employed, as well as suitably designed absorption processes.

Accordingly, we claim as our invention:

1. A process for the preparation of low molecular weight, alphatic thioethers having the general formula:

$$R_1—S—R_2$$

where $R_1$ and $R_2$ are saturated, alkyl radicals having not more than 8 carbon atoms in each radical which comprises reacting a saturated, aliphatic ether having 1 to 8 carbon atoms per alkyl substituent with hydrogen sulfide in the presence of a catalyst consisting essentially of a solid, porous, acidic oxide, hydrocarbon cracking catalyst "having incorporated therein 1–10% by weight of at least one oxide of a metal selected from the group consisting of cerium, zinc, and silver," at a temperature within the range of about 600°–950° F., a pressure within the range of about atmospheric–200 p.s.i.g., and a mol ratio of hydrogen sulfide/ether within the range of about 0.5–1.5.

2. A process in accordance with claim 1 in which said hydrocarbon cracking catalyst has incorporated therein about 1–10% by weight of silver oxide.

3. A process in accordance with claim 1 in which said hydrocarbon cracking catalyst has incorporated therein 1–10% by weight of zinc oxide.

4. A process in accordance with claim 1 in which said hydrocarbon cracking catalyst has incorporated therein 1–10% by weight of cerium oxide.

5. A process for the preparation of low molecular weight aliphatic thioethers having the general formula $R_1—S—R_2$ where $R_1$ and $R_2$ are saturated alkyl radicals having more than 8 carbon atoms in each radical which comprises reacting a saturated, aliphatic ether having 1–8 carbon atoms per alkyl substituent with hydrogen sulfide at a temperature within the range of about 600–950° F., a pressure within the range of about atmospheric–200 p.s.i.g., and a mol ratio of hydrogen sulfide/ether within the range of about 0.5–1.5, in the presence of a solid catalyst selected from the group consisting of "activated alumina, silica-alumina, silica-alumina-zirconia, and silica-magnesia, promoted with 1–10% by weight of a metal oxide of the group consisting of silver oxide, zinc oxide, and cerium oxide."

6. A process for the preparation of dimethyl sulfide which comprises reacting methyl ether and hydrogen sulfide at a temperature of about 600–950° F., a pressure within the range of about atmospheric –200 p.s.i.g., and a mol ratio of hydrogen sulfide/methyl ether within the range of about 0.5–1.5, in the presence of a solid, porous, acidic oxide, hydrocarbon cracking catalyst "having incorporated therein 1–10% by weight of a metal oxide of the group consisting of silver oxide, zinc oxide, and cerium oxide."

7. A process in accordance with claim 6 in which said hydrocarbon cracking catalyst has incorporated therein about 1–10% by weight of silver oxide.

8. A process in accordance with claim 6 in which said hydrocarbon cracking catalyst has incorporated therein 1–10% by weight of zinc oxide.

9. A process in accordance with claim 6 in which said hydrocarbon cracking catalyst has incorporated therein 1–10% by weight of cerium oxide.

10. A process for the preparation of low molecular weight, aliphatic thioethers having the general formula:

$$R_1—S—R_2$$

where $R_1$ and $R_2$ are saturated, alkyl radicals having not more than 8 carbon atoms in each radical which comprises reacting a saturated, aliphatic ether having 1 to 8 carbon atoms per alkyl substituent with hydrogen sulfide in the presence of a catalyst consisting essentially of a solid, porous, acidic oxide, hydrocarbon cracking catalyst having incorporated therein 1–10% by weight of at least one oxide of a metal selected from the group consisting of cerium, zinc, and silver, at a temperature within the range of about 600°–950° F., and a pressure within the range of about atmospheric –200 p.s.i.g.

11. A process for the preparation of dimethyl sulfide which comprises reacting methyl ether and hydrogen sulfide at a temperature of about 600–950° F., and a pressure within the range of about atmospheric –200 p.s.i.g., in the presence of a solid, porous, acidic oxide, hydrocarbon cracking catalyst having incorporated therein 1–10% by weight of a metal oxide of the group consisting of silver oxide, zinc oxide, and cerium oxide.

References Cited in the file of this patent

UNITED STATES PATENTS 2,816,146    Doumani _____ Dec. 10, 1957

OTHER REFERENCES

Jurjew: Ber. Deut. Chem., 69, 1002–1004 (1936).